United States Patent
Higashiyama

(10) Patent No.: US 8,730,522 B2
(45) Date of Patent: May 20, 2014

(54) IMAGE FORMING APPARATUS HAVING PLURAL DEFLECTION UNITS AND TO PERFORM POSITIONAL SHIFT CORRECTION

(75) Inventor: Makoto Higashiyama, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 126 days.

(21) Appl. No.: 13/560,113

(22) Filed: Jul. 27, 2012

(65) Prior Publication Data

US 2013/0038885 A1 Feb. 14, 2013

(30) Foreign Application Priority Data

Aug. 11, 2011 (JP) .................. 2011-176288

(51) Int. Cl.
- *G06K 15/00* (2006.01)
- *G03F 3/08* (2006.01)
- *H04N 1/46* (2006.01)

(52) U.S. Cl.
USPC ............. 358/1.9; 358/2.1; 358/518; 358/537

(58) Field of Classification Search
None
See application file for complete search history.

(56) References Cited

U.S. PATENT DOCUMENTS

2004/0046981 A1 3/2004 Taka et al.
2007/0064087 A1* 3/2007 Matsumae et al. ............ 347/241
2009/0213401 A1 8/2009 Higashiyama et al.
2009/0225378 A1* 9/2009 Minamino ................ 358/513
2010/0253981 A1 10/2010 Higashiyama et al.

FOREIGN PATENT DOCUMENTS

| JP | 2004-117384 | 4/2004 |
|---|---|---|
| JP | 2008-051943 | 3/2008 |
| JP | 2009-075155 | 4/2009 |
| JP | 2010-217785 | 9/2010 |
| JP | 2010-217798 | 9/2010 |

* cited by examiner

*Primary Examiner* — Benny Q Tieu
*Assistant Examiner* — Haris Sabah
(74) *Attorney, Agent, or Firm* — Oblon, Spivak, McClelland, Maier & Neustadt, L.L.P.

(57) ABSTRACT

An image forming apparatus includes a first light source that emits light when color print is specified; a first deflection unit that deflects the light emitted from the first light source; a first driving unit that drives the first deflection unit; a second light source that emits light when color print is specified and when monochrome print is specified; a second deflection unit that deflects the light emitted from the second light source; a second driving unit that drives the second deflection unit; a control unit that, when a image data receiving unit receives first image data and information specifying that the first image data is to be printed in monochrome and receives second image data and information specifying that the second image data is to be printed in color, causes the first driving unit to operate while a monochrome image corresponding to the first image data is being formed.

4 Claims, 14 Drawing Sheets

IMAGE FORMING APPARATUS HAVING PLURAL DEFLECTION UNITS AND TO PERFORM POSITIONAL SHIFT CORRECTION

CROSS-REFERENCE TO RELATED APPLICATIONS

The present application claims priority to and incorporates by reference the entire contents of Japanese Patent Application No. 2011-176288 filed in Japan on Aug. 11, 2011.

BACKGROUND OF THE INVENTION

1. Field of the Invention

The invention relates to an image forming apparatus.

2. Description of the Related Art

In connection with an image forming apparatus, a color-matching adjusting process is known which is performed to correct a shift of a printing position of each color ink on a recording sheet. In the color-matching adjusting process, quality checkup images are actually printed on a recording sheet with respective color inks, the overlapping state of the images of the respective colors is detected, and a printing position of each color is corrected based on the detection result. The image forming apparatus performs the color-matching adjusting process when a degree of shift of the printing position of each color is anticipated to be outside a predetermined proper range in the quality checkup image.

Examples of the case where a degree of shift of the printing position of each color is anticipated to be outside a proper range include a case where a predetermined time has passed, a case where a predetermined number of images have been formed, a case where the environment has changed, and a case where a power supply has been turned on or off, after a previous adjusting process was performed.

Moreover, for example, Japanese Patent Application Laid-open No. 2004-117384 discloses a technique for use in an image forming apparatus, which predicts whether a degree of shift of a printing position of each color is outside a proper range, based on usage conditions or environment (e.g., temperature) at the time of performing color-matching adjustment for the purpose of suppressing waste of a developer or the like and executing the color-matching adjustment with high efficiency.

However, in an image forming apparatus including a plurality of writing units, the conventional color-matching adjusting process has a problem in that a color shift occurs easily at the time of switching from a monochrome printing operation to a color printing operation. The color shift may be resolved by frequently performing the color-matching adjustment. However, such a technique accompanies another problem of an increased downtime because a printing process cannot be performed during the color shift adjustment.

Therefore, there is a need for an image forming apparatus that is capable of decreasing a color shift in a color printing, and reducing downtime.

SUMMARY OF THE INVENTION

According to an embodiment, there is provided an image forming apparatus that forms an image on a recording sheet based on image data. The image forming apparatus includes an image data receiving unit that receives the image data, and print-type specification information that specifies whether to print the image data in color or monochrome; a first light source that, when the image data receiving unit receives a print-type specification information specifying that print target image data is to be printed in color, emits light based on the print target image data; a first deflection unit that deflects the light from the first light source; a first driving unit that drives the first deflection unit; a second light source that, when the image data receiving unit receives a print-type specification information specifying that print target image data is to be printed in monochrome, emits light based on the print target image data; a second deflection unit that deflects the light from the second light source; a second driving unit that drives the second deflection unit; an image forming unit that forms a monochrome image corresponding to the print target image data on a recording sheet based on the light deflected by the second deflection unit, and forms a color image corresponding to the print target image data on a recording sheet based on both of the light deflected by the first deflection unit and the light deflected by the second deflection unit; a drive control unit that, when the image data receiving unit receives first image data and first print-type specification information specifying that the first image data is to be printed in monochrome and receives second image data to be subsequently processed after the first image data and second print-type specification information specifying that the second image data is to be printed in color, causes the first driving unit to operate while a monochrome image corresponding to the first image data is being formed by the image forming unit; a temperature detection unit that detects a temperature of the first deflection unit and a temperature of the second deflection unit; a correction image formation instruction unit that instructs the image forming unit to form positional shift correction images used to correct positions of images of respective colors formed on a recording sheet when a difference in temperature between the first deflection unit and the second deflection unit is equal to or greater than a predetermined temperature threshold; and a color shift correction unit that corrects the positions of the images of the respective colors, based on the positional shift correction images.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The preferred embodiment of an image forming apparatus according to the invention is described in detail with reference to the accompanying drawings.

Figure 1:
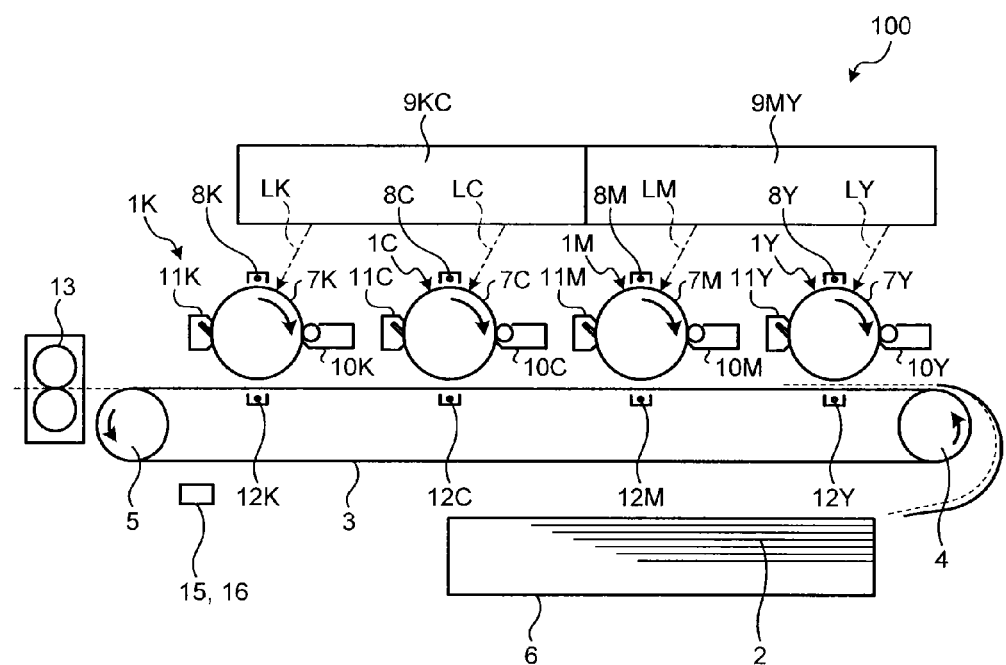
FIG. 1 is a diagram illustrating a configuration of a relevant part of a color copier 100.

FIG. 1 is a configuration view of a relevant part of a color copier 100 as an image forming apparatus according to an embodiment, the part being related to an image forming process. The color copier 100 is an apparatus of a tandem type in which, in an image processing unit for forming images of different colors (Y: Yellow, M: Magenta, C: Cyan, and K: blacK), four image forming units 1Y, 1M, 1C, and 1K are arranged in line along a transfer belt 3 that transports a recording sheet 2 serving as a transfer medium.

The transfer belt 3 is stretched between a drive roller 4 which performs drive rotation and a driven roller 5 which performs driven rotation, and the transfer belt 3 is driven to rotate along with the rotation of the drive roller 4 in the direction of an arrow in the drawing. Under the transfer belt 3, a paper feed tray 6 in which recording sheets 2 are stored is provided. The recording sheet 2 at the top of a stack of the recording sheets 2 stored in the paper feed tray 6 is fed toward the transfer belt 3 at the time of forming an image, and is adsorbed onto the transfer belt 3 by electrostatic adsorption. The adsorbed recording sheet 2 is transported to the image forming unit 1Y, and a first image of Y color is formed there.

The image forming units 1Y, 1M, 1C, and 1K respectively include photosensitive drums 7Y, 7M, 7C, and 7K, and chargers 8Y, 8M, 8C, and 8K arranged around the photosensitive drums 7Y, 7M, 7C, and 7K, developing units 10Y, 10M, 10C, and 10K, photosensitive cleaners 11Y, 11M, 11C, and 11K, and transfer devices 12Y, 12M, 12C, and 12K, respectively.

A surface of the photosensitive drum 7Y of the image forming unit 1Y is uniformly charged by the charger 8Y and then exposed with a laser beam LY corresponding to a Y color image by an exposing unit (MY) 9MY, so that an electrostatic latent image is formed. The formed electrostatic latent image is developed by the developing unit 10Y, so that a toner image is formed on the photosensitive drum 7Y. The toner image is transferred, by the transfer device 12Y, onto the recording sheet 2 at a position (transfer position) where the photosensitive drum 7Y is in contact with the recording sheet 2 on the transfer belt 3 and, as a result, a monochrome image (Y color) is formed on the recording sheet 2. In the photosensitive drum 7Y, which has undergone a transfer operation, an unnecessary toner that remains on the surface of the drum is removed by the photosensitive cleaner 11Y, and thus the drum prepares for the following image formation.

The recording sheet 2 to which one color (Y color) has been transferred in this way by the image forming unit 1Y is transported to the image forming unit 1M by the transfer belt 3. In a similar manner to the image forming operation for Y color described above, an exposure is performed with a laser beam LM corresponding to M color by the exposing unit (MY) 9MY, an image forming operation for M color is performed, and a toner image of M color formed on the photosensitive drum 7M is transferred to the recording sheet 2 in a superimposed manner. After that, the recording sheet 2 is further transported to the image forming unit 1C, an exposure is performed with a laser beam LC corresponding to C color by an exposing unit (KC) 9KC, an image forming process for C color is performed, and a toner image of C color is transferred to the recording sheet 2 in a superimposed manner. The recording sheet 2 is yet further transported to the image forming unit 1K, an exposure is performed with a laser beam LK corresponding to K color by the exposing unit (KC) 9KC, an image forming process for K color is performed, and a toner image of K color is transferred to the recording sheet 2 in a superimposed manner. In this way, a color image is formed on the recording sheet 2. In addition, the recording sheet 2 on which the color toner image is formed by passing through the image forming unit 1K, is separated from the transfer belt 3, then subjected to a fixing process using the action of heat and pressure in a fixing unit 13, and finally discharged. The image forming units 1Y, 1M, 1C, and 1K collectively serve as an image forming mechanism.

Incidentally, in the tandem-type color copier 100, positional alignment (color shift correction) between colors is important in terms of its configuration. Examples of the color shift between colors include misregistration in a main scanning direction (the direction parallel to the axis of rotation of each of the photosensitive drums 7K, 7M, 7C, and 7Y), misregistration in a sub scanning direction (the direction perpendicular to the axis of rotation of each of the photosensitive drums 7K, 7M, 7C, and 7Y), main scanning magnification variation, skew, and so on. Accordingly, in the color copier 100 according to the embodiment, the color shift correction between colors is performed before an actual color image forming operation is performed on the recording sheet 2. The color shift correction process is described later.

Figure 2:
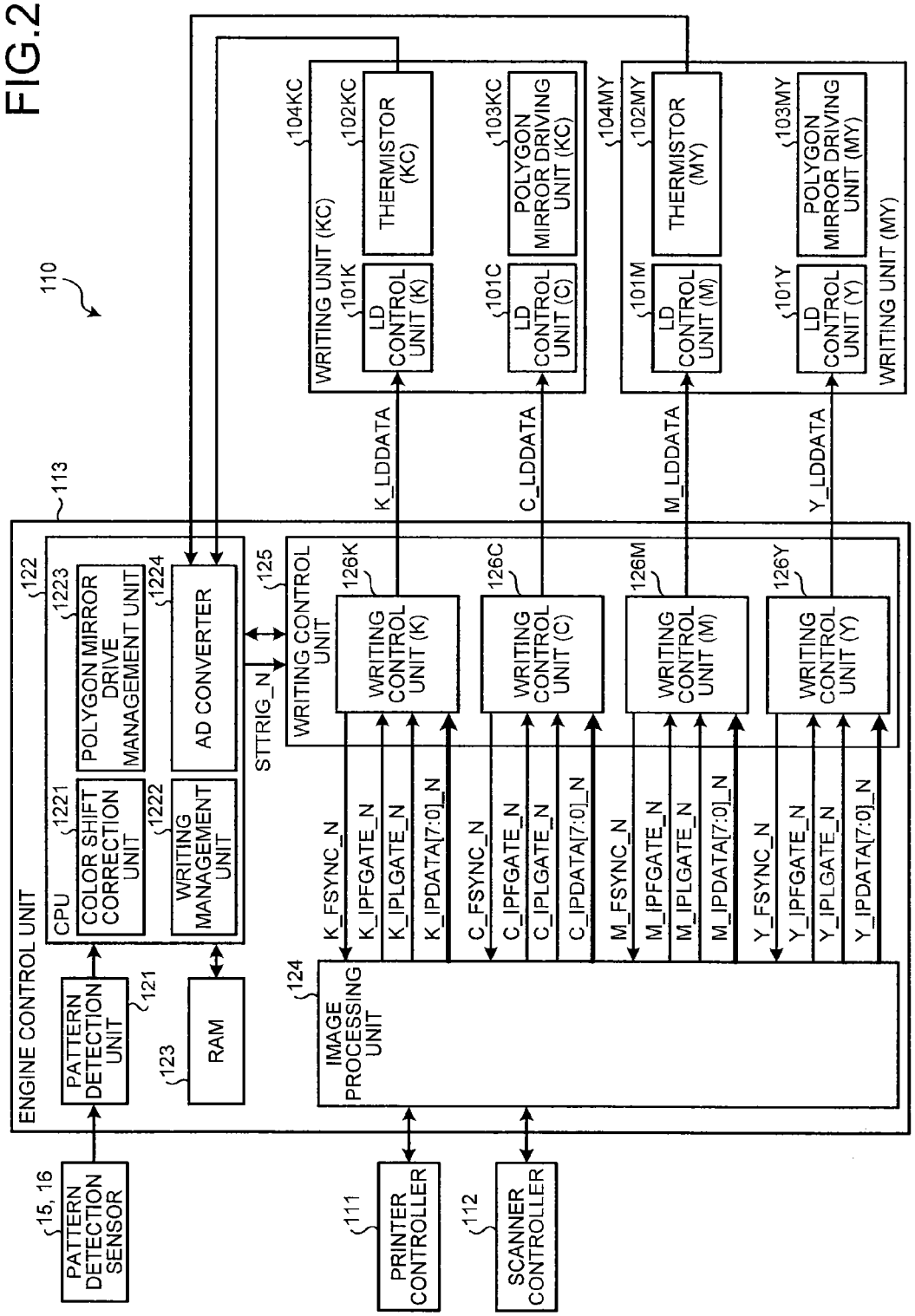
FIG. 2 is a block diagram illustrating a functional configuration of a positional shift correction unit 110.

FIG. 2 is a block diagram illustrating a functional configuration of a positional shift correction unit 110 which corrects the shifts of printing positions of colors in the color copier 100. The positional shift correction unit 110 includes pattern detection sensors 15 and 16, a printer controller 111, a scanner controller 112, an engine control unit 113, a writing unit (KC) 104KC, and a writing unit (MY) 104MY.

The engine control unit 113 includes a pattern detection unit 121, a color shift correction unit 1221, a writing management unit 1222, a polygon mirror drive management unit 1223, an AD (analog-to-digital) converter 1224, a RAM (Random Access Memory) 123, an image processing unit 124, and a writing control unit 125. The writing control unit 125 includes a writing control unit (K) 126K, a writing control unit (M) 126M, a writing control unit (C) 126C, and a writing control unit (Y) 126Y which perform writing control on corresponding colors, respectively. The color shift correction unit 1221, the writing management unit 1222, the polygon mirror drive management unit 1223, and the AD converter 1224 are implemented by a CPU (Central Processing Unit) 122.

The writing unit (KC) 104KC includes a K color LD (Laser Diode) control unit 101K, a C color LD control unit 101C, a thermistor (KC) 102KC, and a polygon mirror driving unit 103KC. The writing unit (MY) 104MY includes an M color LD control unit 101M, a Y color LD control unit 101Y, a thermistor (MY) 102MY, and a polygon mirror driving unit 103MY. The LD control units 101K and 101C are installed in the exposing unit 9KC. The LD control units 101M and 101Y are installed in the exposing unit 9MY.

The pattern detection sensors 15 and 16 detect color shift correction patterns 14 transferred to the transfer belt 3 to calculate an amount of a color shift between colors. The pattern detection sensors 15 and 16 each output an analog detection signal to the engine control unit 113, upon detecting the color shift correction pattern 14.

The printer controller 111 receives image data transmitted from an external unit (for example, a PC (Personal Computer)) through a network. The printer controller 111 also receives information on print-type specification that specifies whether to print the image data in color or to print in monochrome, along with the image data. The printer controller 111 transfers the received image data to the image processing unit 124 along with the information on the print-type specification. When a color print is specified, a color image is formed with all K, C, M, and Y colors in the color copier 100. On the other hand, when a monochrome print is specified, a monochrome image is formed only with two colors (K and C) in the color copier 100.

The scanner controller 112 acquires image data, which corresponds to an original read by a scanner (not illustrated), and transfers the acquired image data to the image processing unit 124. For the image data acquired by the scanner controller 112, a print-type, from between color print and monochrome print, is specified by the user through an operation display unit to be described later, and information on the specified print-type is transferred to the image processing unit 124 along with the image data.

The pattern detection unit 121 amplifies the detection signals output from the pattern detection sensors 15 and 16, converts the amplified analog detection signals into digital data, and stores the converted digital data in the RAM 123.

The color shift correction unit 1221 calculates a color shift amount from the digital data stored in the RAM 123, and calculates a correction amount used to correct the calculated color shift amount. In the embodiment, the color shift correction unit 1221 sets K color as a reference color, defines a shift amount from K color as the color shift amount of each color, and calculates the correction amount for each color based on the result of the former calculation. Here, the reference color represents a color used as a reference in positional alignment, the color shift between colors is corrected by aligning positions of the other colors to a position of the reference color. Here, examples of the color shift amount includes a distortion amount of each color, a magnification error amount in the main scanning direction, a main scanning direction misregistration amount and a sub scanning direction misregistration amount (hereinafter, referred to as main/sub misregistration amounts), a skew amount, and so on. Examples of the correction amount includes a distortion correction amount of each color, a main scanning magnification correction amount, a main scanning direction registration correction amount and a sub scanning direction registration correction amount (hereinafter, referred to as main/sub registration correction amounts), a skew correction amount, and so on that are all calculated from various kinds of color shift amounts, for example, listed above.

In addition, the color shift correction unit 1221 calculates distortion line amounts of Y, M, and C colors, using K color as a reference color, based on a resolution of the image data and the calculated distortion amounts of the respective colors (Y, M, C, and K). In addition, the color shift correction unit 1221 determines the number of lines for a line memory, based on the distortion line amounts of the respective colors from the reference color, that is, K color. The reference color represents a color to define a reference position at the time of calculating the distortion line amounts of the respective colors. In the embodiment, K color is used as the reference color. The RAM 123 stores various kinds of data.

The writing management unit 1222 manages operation of the writing control units 125 to be described later. Specifically, the writing management unit 1222 transmits a start signal STTRIG_N used to control writing timing to the writing control unit 125.

The image processing unit 124 performs various kinds of image processing, according to the image data and printing instructions received by the printer controller 111, or the image data acquired from the scanner controller 112 and corresponding printing instructions. Moreover, the image processing unit 124 receives sub scanning timing signals (K, C, M, Y)_FSYNC_N of respective colors transmitted from the writing control unit 125, and transmits main scanning gate signals (K, C, M, Y)_IPLGATE_N of respective colors, sub scanning gate signals (K, C, M, Y)_IPFGATE_N of respective colors, and image data (K, C, M, Y)_IPDATA_N which accompany these synchronizing signals, to the writing control unit 125.

The writing control unit 125 receives the image data (K, C, M, Y)_IPDATA_N transferred from the image processing unit 124. The writing control unit 125 also receives the start signal STTRIG_N from the writing management unit 1222. The writing control unit 125 performs various kinds of writing processes on the image data (K, C, M, Y)_IPDATA_N received from the image processing unit 124 in response to the start signal STTRIG_N, generates LD light emission data (K, C, M, Y)_LDDATA, and transmits the generated data to each of the LD control units 101K, 101C, 101M, and 101Y.

The LD control units 101K, 101C, 101M, and 101Y control the laser beams LY, LM, LC, and LK, which are emitted from the exposing units 9KC and 9MY to the photosensitive drums 7Y, 7M, 7C, and 7K, based on the LD light emission data (K, C, M, Y)_LDDATA. The emission of the laser beams LK, LC, LM, and LY results in electrostatic latent images formed on the photosensitive drums 7K, 7C, 7M and 7Y, and development treatment on the electrostatic latent image produce toner images. The formed toner images are transferred and fixed to the recording sheet 2, thereby being output.

The outline of a color image forming process in such a color copier 100 is described. The image data transmitted from the PC is processed by the printer controller 111, and the image data of an original read by the scanner (not illustrated) is processed by the scanner controller 112. The processed image data is transferred to the image processing unit 124 of the engine control unit 113. In the image processing unit 124, various kinds of image processes are performed depending on each image data, the image data is converted into color image data of each color, and the converted image data is finally transferred to the writing control unit 125. In the writing control unit 125, printing timing of each color is generated, the image data is received in accordance with the sub scanning timing, various kinds of writing image processes are performed on the received image data to generate LD light emission data, the laser beams LK, LC, LM, and LY are controlled to be emitted by the LD control units of respective colors 101K, 101C, 101M, and 101Y, and images are formed on the photosensitive drums 7K, 7C, 7M and 7Y, respectively.

The polygon mirror driving unit (KC) 103KC, and the polygon mirror driving unit (MY) 103MY respectively drive the polygon mirror (KC) and the polygon mirror (MY) to be described later. The polygon mirror driving unit (MY)

103MY and the polygon mirror driving unit (KC) 103KC function as a first driving unit and a second driving unit, respectively.

The polygon mirror drive management unit 1223 manages the polygon mirror driving unit (KC) 103KC and the polygon mirror driving unit (MY) 103MY. The polygon mirror drive management unit 1223 functions as a drive control unit.

The thermistor (KC) 102KC and the thermistor (MY) 102MY respectively detect the temperature of the writing unit (KC) 104KC including the polygon mirror driving unit (KC) 103KC and the temperature of the writing unit (MY) 104MY including the polygon mirror driving unit (MY) 103MY. The AD converter 1224 converts analog detection signals detected by the thermistor (KC) 102KC and the thermistor (MY) 102MY into digital data, and stores converted digital data in the RAM 123. The thermistor (KC) 102KC and the thermistor (MY) 102MY function as temperature detection units.

The RAM 123 temporarily stores digital data of the temperature information acquired from the thermistor (KC) 102KC and the thermistor (MY) 102MY. The RAM 123 may be replaced with a nonvolatile memory, and the digital data of the temperature information may be stored in the nonvolatile memory.

Figure 3:
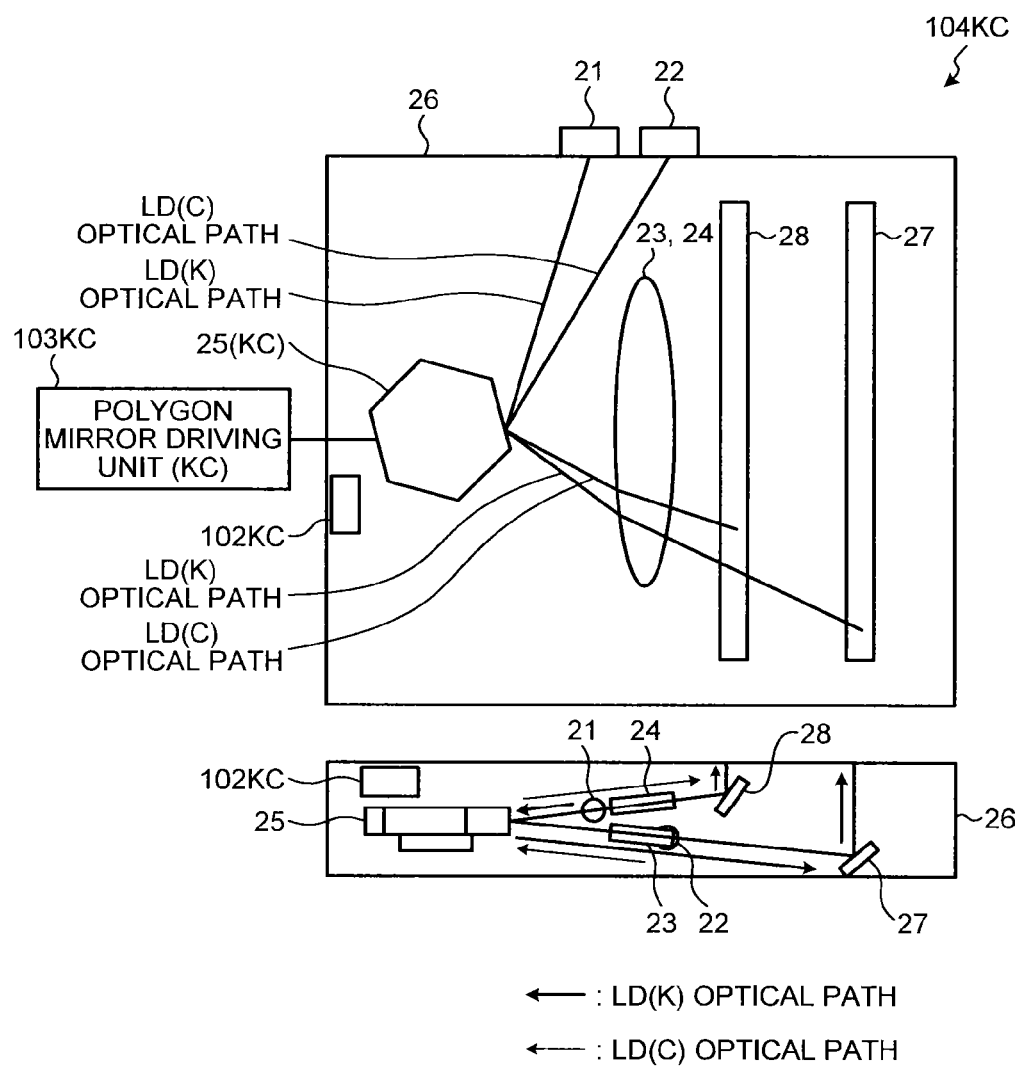
FIG. 3 is a cross-sectional view of a writing unit (KC) 104KC taken along a main scanning direction.

FIG. 3 is a cross-sectional view of the writing unit (KC) 104KC taken along the main scanning direction. The writing unit (MY) 104MY has the same configuration as the writing unit (KC) 104KC. FIG. 3 illustrates a detailed configuration of the writing unit (KC) 104KC. In FIG. 3, reference symbol 21 represents LD(K), reference symbol 22 represents LD(C), reference symbol 23 represents a fθ lens for LD(K), reference symbol 24 represents a fθ lens for LD(C), reference symbol 25 represents a polygon mirror (KC), reference symbol 26 represents a housing, reference symbol 27 represents a reflecting mirror (K), reference symbol 28 represents a reflecting mirror (C), and reference symbol 102 represents a thermistor (KC).

The LD(K) 21 and the LD(C) 22 are all light source units that emit light beams. The LD(K) 21 and the LD(C) 22 each have a laser light-emitting unit configured by using a semiconductor laser, and a collimator lens. The LD(K) 21 and the LD(C) 22 each emit a light beam to the same deflection surface of the polygon mirror (KC) 25 serving as a deflection unit at different angles within a cross-sectional surface taken along the sub scanning direction. The LD(K) 21 and the LD(C) 22 each function as a second light source. Moreover, the LD(M) and the LC(Y) (not illustrated in the drawing) each functions as a first light source.

The fθ lenses, which are a scanning lens forming an imaging unit, are configured by using two fθ lenses that have a fθ characteristic, in which the fθ lens 23 for LD(K) is arranged on a lower side and the fθ lens 24 for LD(C) is arranged on an upper side. The two fθ lenses are provided respectively to correspond to the light beams emit from the LD(K) 21 and the LD(C) 22 that are two light source units. The two fθ lenses image the light beams reflected and deflected by the polygon mirror (KC) at different positions, respectively within a scanned surface. The polygon mirror (KC) 25 is a deflection unit, which reflects the light beam, incident from the light source unit, from its deflection surface so that the light beam is directed to the imaging unit. The polygon mirror (KC) 25 is driven to move by the polygon mirror driving unit (KC) 103KC. In other words, it reflects the light beams which have been obliquely incident from the LD(K) 21 and the LD(C) 22 from its same deflection surface so that the light beams are directed to the fθ lens 23 for LD(K) and the fθ lens 24 for LD(C), respectively. Moreover, it rotates, for example, counterclockwise at a predetermined speed by the polygon mirror driving unit (KC) 103KC. The housing 26 accommodates various devices that form a scanning optical device. The reflection mirror (K) 27 and the reflection mirror (C) 28 reflect the light beams, which have been deflected and reflected by the polygon mirror (KC) 25 and then has passed through the fθ lens 23 for LD(K) and the fθ lens 24 for LD(C), respectively, so that the light beams are imaged at different exposure positions on the scanned surface. The polygon mirror (KC) 25 functions as a second deflection unit, and a polygon mirror (MY) (not illustrated in the drawing) functions as a first deflection unit.

An LD(K) optical path starts from the optical path of the LD(K) 21, reaches the polygon mirror (KC) 25, is deflected and reflected by the polygon mirror (KC) 25, travels passing through the fθ lens 23 for LD(K), is reflected by the corresponding reflection mirror (K) 27, and finally scans along the scanned surface. An LD(C) optical path is also similarly configured to travel through the polygon mirror (KC) 25, the fθ lens 24 for LD(C), and the reflection mirror (C) 28, and finally scans the scanned surface. Moreover, the temperature of the scanning optical device is detected by the thermistor (KC) 102KC.

As described above, in the color copier 100 according to the embodiment, the writing units are divided into the writing unit (KC) 104KC which writes images of KC colors and the writing unit (MY) 104MY which writes images of MY colors, and only the polygon mirror (KC) 25 for KC rotates at the time of performing a monochrome printing operation. That is, the polygon mirror driving unit (KC) 103KC is driven to operate. Therefore, during the monochrome printing operation, the temperature of the writing unit (KC) 104KC including the polygon mirror driving unit (KC) 103KC rises. On the other hand, during the monochrome printing operation, the polygon mirror (MY) does not rotate and remains not operating. Accordingly, the polygon mirror driving unit (MY) 103MY is also not driven to operate. Therefore, during the monochrome printing operation, the temperature of the writing unit (MY) 104MY including the polygon mirror driving unit (MY) 103MY does not rise.

Figure 4:
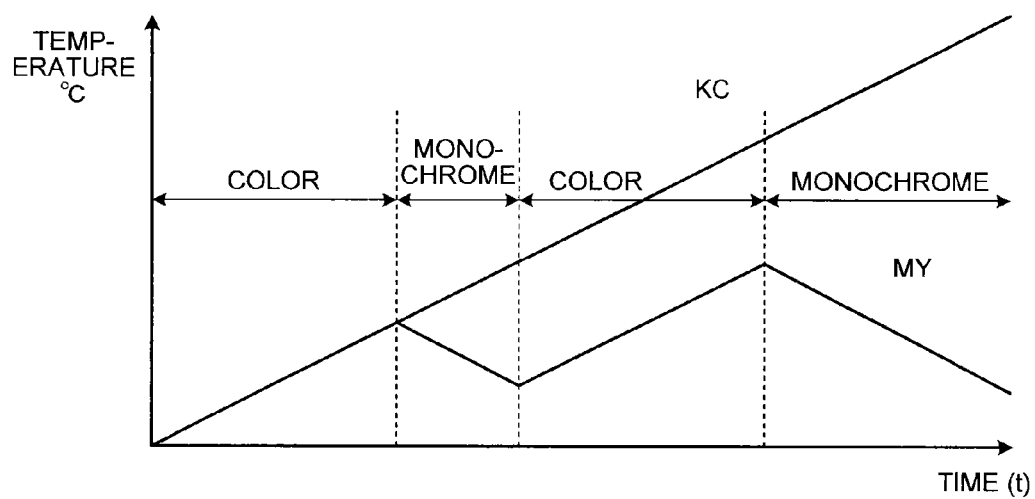
FIG. 4 is a diagram illustrating an example of temperature changes of a writing unit (MY) 104MY and a writing unit (KC) 104KC.

FIG. 4 is a graph illustrating an example of temperature changes of the writing unit (KC) 104KC and the writing unit (MY) 104MY in the case where color/monochrome printing operations are repeatedly executed in the color copier 100. As illustrated in the graph, when a printing process is executed such that color printing, monochrome printing, color printing, and monochrome printing are sequentially executed in this order, the polygon mirrors of both of the writing unit (KC) 104KC and the writing unit (MY) 104MY rotate at the time of executing the first color printing. That is, both of the polygon mirror driving unit (KC) 103KC and the polygon mirror driving unit (MY) 103MY operate. Accordingly, the temperatures of both of the writing unit (KC) 104KC and the writing unit (MY) 104MY rise.

Subsequently, when executing the monochrome printing, the polygon mirror of the writing unit (KC) 104KC rotates but the polygon mirror of the writing unit (MY) 104MY stops rotating. Accordingly, the temperature of the writing unit (KC) 104KC further rises. On the other hand, the temperature of the writing unit (MY) 104MY falls.

Subsequently, at the time of executing the following color printing, the temperature of the writing unit (KC) 104KC still further rises. At this time, the temperature of the writing unit (MY) 104MY rises, but is lower than that of the writing unit (KC) 104KC because the temperature of the writing unit (MY) 104MY has decreased once during the execution of the immediately previous monochrome printing. Subsequently, at the time of executing the following monochrome printing, while the temperature of the writing unit (KC) 104KC yet further rises, the temperature of the writing unit (MY) 104MY decreases.

That is, when the monochrome printing is executed, there are cases where a temperature difference between the writing unit (KC) 104KC and the writing unit (MY) 104MY increases. That is, when the color printing is performed after the monochrome printing has been performed, the temperature difference between the writing units or the temperature gradient increases. Such the temperature difference between the writing units, or the temperature gradient, has a great influence on the positional shift. That is, the higher the temperature difference between the writing units or the temperature gradient, the larger the degree of the positional shift.

Accordingly, in the color copier 100 according to the embodiment, in order to prevent the temperature difference between the writing units from increasing, the polygon mirror drive management unit 1223 of the engine control unit 113 is provided with a function of managing drive of the polygon mirrors by each of the polygon mirror driving units 103KC and 103MY of the writing units 104KC and 104MY.

Figure 5:
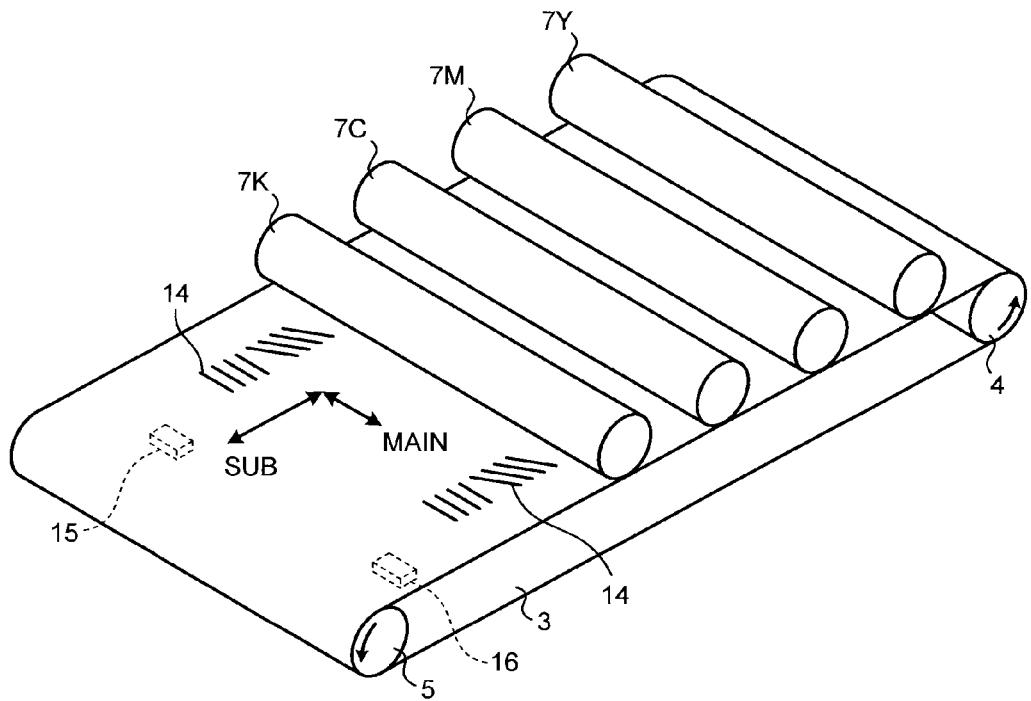
FIG. 5 is a perspective view of a transfer belt illustrating a state in which a positional shift correction pattern is formed.
Figure 6:
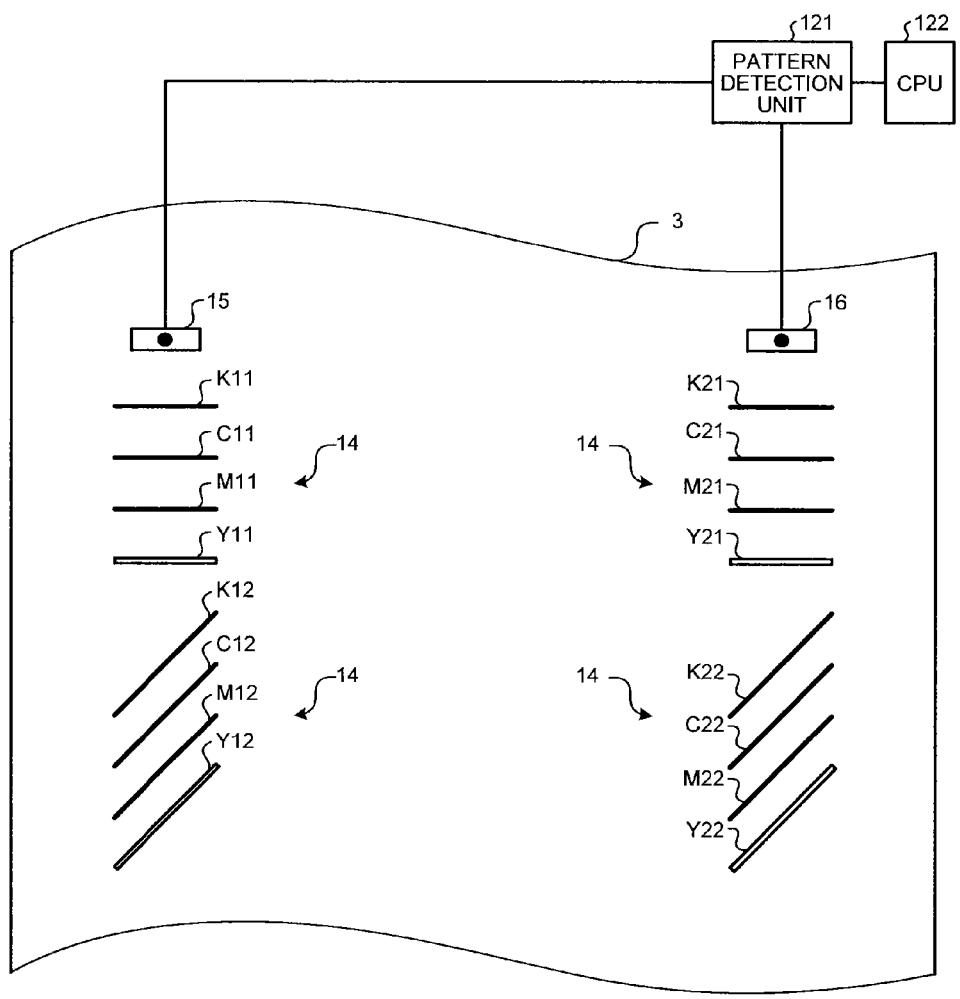
FIG. 6 is an enlarged view of the positional shift correction pattern of FIG. 5.

FIG. 5 is a perspective view of a transfer belt which illustrates a state in which a positional shift correction pattern is formed. FIG. 6 is an enlarged view of the positional shift correction pattern of FIG. 5. In the color copier 100 according to the embodiment, in order to correct the positional shift, the color shift correction patterns 14 of respective colors on the transfer belt 3 are formed by the respective image forming units 1Y, 1M, 1C, and 1K, and the color shift correction patterns 14 are detected by the pattern detection sensors 15 and 16.

In the example of FIG. 5, the pattern detection sensors 15 and 16 are arranged at both ends of the transfer belt 3 in the main scanning direction. On the transfer belt 3, the color shift correction patterns 14 are formed to correspond to arrangement positions of the pattern detection sensors 15 and 16. As the color shift correction patterns 14, patterns of four parallel lines (K11, C11, M11, Y11; K21, C21, M21, Y21) and patterns of four oblique lines (K12, C12, M12, Y12; K22, C22, M22, Y22) are arranged at a certain interval therebetween in the sub scanning direction. The color shift correction patterns 14 are formed to be repeated in the moving direction of the transfer belt 3. In order to increase the number of samples to reduce the influence of errors, the color shift correction patterns 14 are output onto a plurality of sheets, in a manner to match the pattern detection sensors 15 and 16 as illustrated in FIG. 6. The color shift correction patterns 14 are detected while the color shift correction patterns are moving in the transport direction of the transfer belt 3 as illustrated in the same drawing and sequentially passing over the pattern detection sensors 15 and 16.

The color shift correction patterns 14 formed on the transfer belt 3 are detected by the pattern detection sensors 15 and 16. Detection signals output from the pattern detection sensors 15 and 16 are converted from analog data to digital data by the pattern detection unit 121. The color shift correction unit 1221 samples the digital data which is a result of conversion by the pattern detection unit 121 and stores the sampled digital data in the RAM 123. When the detection of the color shift correction patterns 14 has been completed once, the color shift correction unit 1221 performs an mathematical operation on the digital data stored in the RAM 123 to calculate various kinds of color shift amounts (for each color, a distortion amount, a main scanning direction magnification error amount, main/sub misregistration amounts, a skew shift amount, and the like), and calculates correction amounts of each shift component from the color shift amounts.

Figure 7:
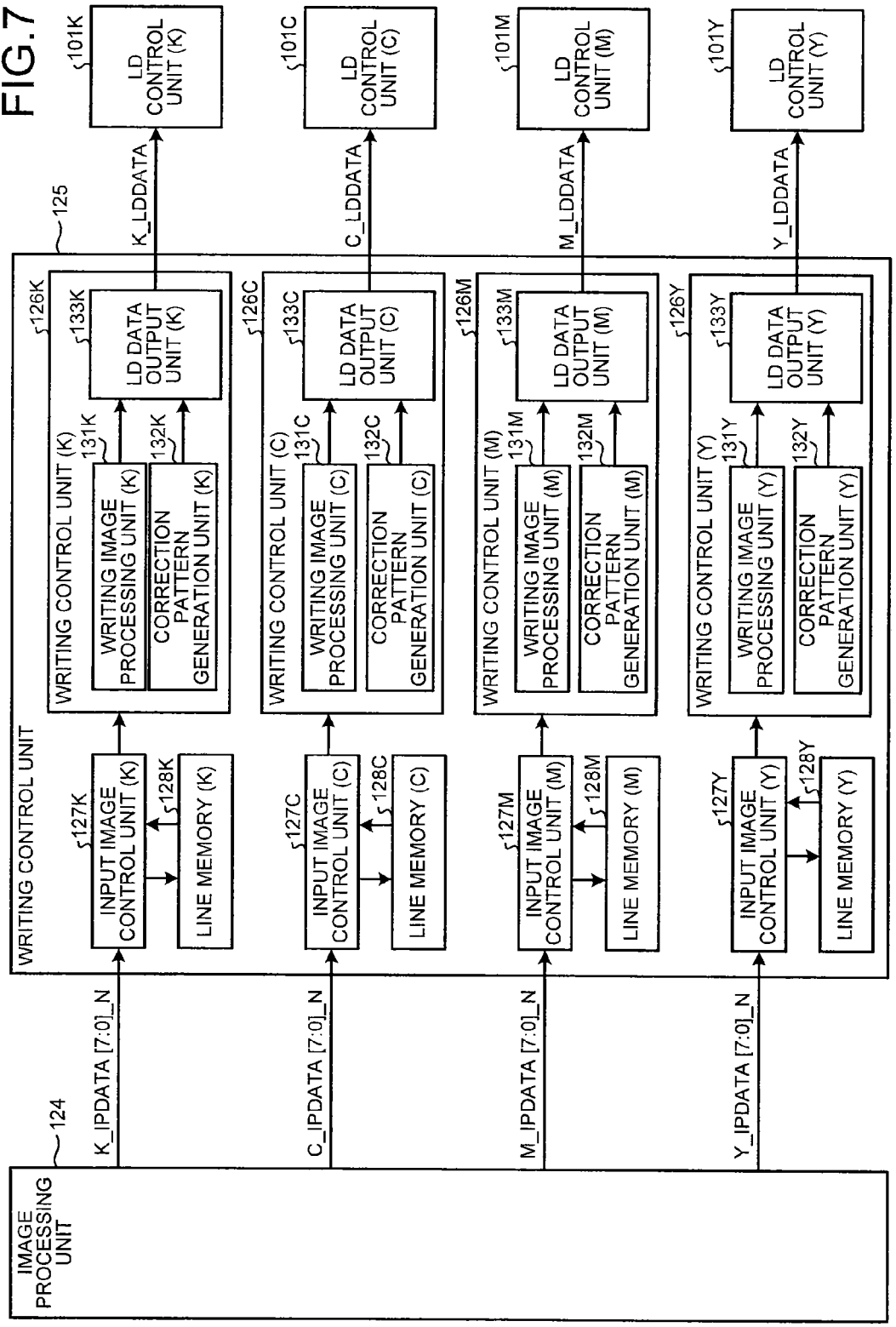
FIG. 7 is a block diagram illustrating detailed functions of a writing control unit 125 of an engine control unit 113 described in FIG. 2.

FIG. 7 is a block diagram illustrating detailed functions of the writing control unit 125 of the engine control unit 113 which has been described referring to FIG. 2. The writing control unit 125 includes the writing control units 126K, 126C, 126M, and 126Y, input image control units 127K, 127C, 127M, and 127Y, and line memories 128K, 128C, 128M, and 128Y, respectively for K, C, M, and Y colors.

The input image control units 127K, 127C, 127M, and 127Y receive image data transmitted from the image processing unit 124, store the received image data in the line memories 128K, 128C, 128M, and 128Y, sequentially read out the stored image data, and transfer the read image data to the writing control units 126K, 126C, 126M, and 126Y of respective colors.

The input image control units 127K, 127C, 127M, and 127Y store the image data in the line memories 128K, 128C, 128M, and 128Y of respective colors, based on distortion line amounts calculated by the color shift correction unit 1221. In the embodiment, the input image control units 127K, 127C, 127M, and 127Y receive the image data of a binary image of one bit from the image processing unit 124, and transfers the received image data to the writing control units 126K, 126C, 126M, and 126Y. In the embodiment, the image data of the binary image is transferred to the writing control units 126K, 126C, 126M, and 126Y. However, image data is not limited to the image data of the binary image. For example, the input image control units 127K, 127C, 127M, and 127Y may convert the image data of the binary image received from the image processing unit 124 into image data having four-bit density values (0 (=white pixel) to 15 (=black pixel)), and transfer the converted image data to the writing control units 126K, 126C, 126M, and 126Y.

The line memories 128K, 128C, 128M, and 128Y are memories to sequentially store therein the image data transferred from the image processing unit 124. The K color writing control unit 126K includes a writing image processing unit 131K, a correction pattern generation unit 132K, and an LD data output unit 133K. The C, M, and Y color writing control units 126C, 126M, and 126Y all have the same structure as the K color writing control unit 126K. That is, the C, M, and Y color writing control units 126C, 126M, and 126Y respectively include writing image processing units 131M, 131C, and 131Y, correction pattern generation units 132C, 132M, and 132Y, and LD data output units 133C, 133M, and 133Y.

In FIG. 7, in order to simplify the description, three kinds of signals including the main scanning gate signals (K, C, M, Y)_IPLGATE_N, the sub scanning gate signals (K, C, M, Y)_IPFGATE_N, and the image signals (K, C, M, Y)_IPDATA_N that accompany the synchronizing signals, for respective corresponding colors, which are described with reference to FIG. 2, are collectively referred to as writing control signals (K, C, M, Y)_IPDATA[7:0]_N.

The writing image processing units 131K, 131C, 131M, and 131Y perform various kinds of image processes by using the image data stored in the line memories 128K, 128C, 128M, and 128Y.

The correction pattern generation units 132K, 132C, 132M, and 132Y generate color shift correction patterns 14 for correcting the color shift and density shift of each color on the transfer belt 3, and output the generated color shift correction patterns 14 or the like through the LD data output units 133K, 133C, 133M, and 133Y. As a result, the color shift correction patterns 14 are formed on the transfer belt 3.

The RAM 123 may be replaced with a nonvolatile memory, and digital data of the color shift correction patterns 14 may be stored in the RAM 123.

The LD data output units 133K, 133C, 133M, and 133Y transmit correction writing instructions (LD light emission data (K, C, M, Y)_LDDATA), which respond to the image data acquired from the writing image processing units 131K, 131C, 131M, and 131Y and also respond to the main/sub registration correction amounts calculated by the color shift correction unit 1221, to the LD control units 101K, 101C, 101M, and 101Y, and perform control of correcting shifts of writing timings by laser light irradiation. The LD data output units 133K, 133C, 133M, and 133Y transmit image frequency change instructions (LD light emission data (K, C, M, Y)_LDDATA), which respond to the main scanning magnification correction amounts calculated by the color shift correction unit 1221, to the LD control units 101K, 101C, 101M, and 101Y, and perform control of correcting the magnification errors in the main scanning direction.

Moreover, the LD data output units 133K, 133C, 133M, and 133Y transmit instructions (LD light emission data (K, C, M, Y)_LDDATA), which form the color shift correction patterns 14 acquired from the correction pattern generation units 132K, 132C, 132M, and 132Y on the transfer belt 3, to the LD control units 101K, 101C, 101M, and 101Y. Each of the LD data output units 133K, 133C, 133M, and 133Y is equipped with a device which can finely set an output frequency, for example, a clock generator which uses a VCO (Voltage Controlled Oscillator).

Here, an image writing process performed by the writing control units 126K, 126C, 126M, and 126Y is described in detail. First, the image writing process for K color in FIG. 7 is described. First of all, image data K_IPDATA[7:0]_N is transmitted from the image processing unit 124 to the input image control unit 127K. The input image control unit 127K temporarily stores the image data in the line memories 128K, and at the same time transmits the image data to the writing control unit 126K. In the writing control unit 126K, the writing image processing unit 131K transmits the image data transmitted from the input image control unit 127K to the LD data output unit 133K. The LD data output unit 133K generates K color LD light emission data K_LDDATA, and transmits it to the LD control unit 101K.

At the time of outputting the color shift correction patterns 14 and the density shift correction patterns, the image data of K, C, M, and Y colors is transmitted from the correction pattern generation units 132K, 132C, 132M, and 132Y to the LD data output units 133K, 133C, 133M, and 133Y of respective colors. After that, an operation similar to that as described above is performed.

Figure 8:
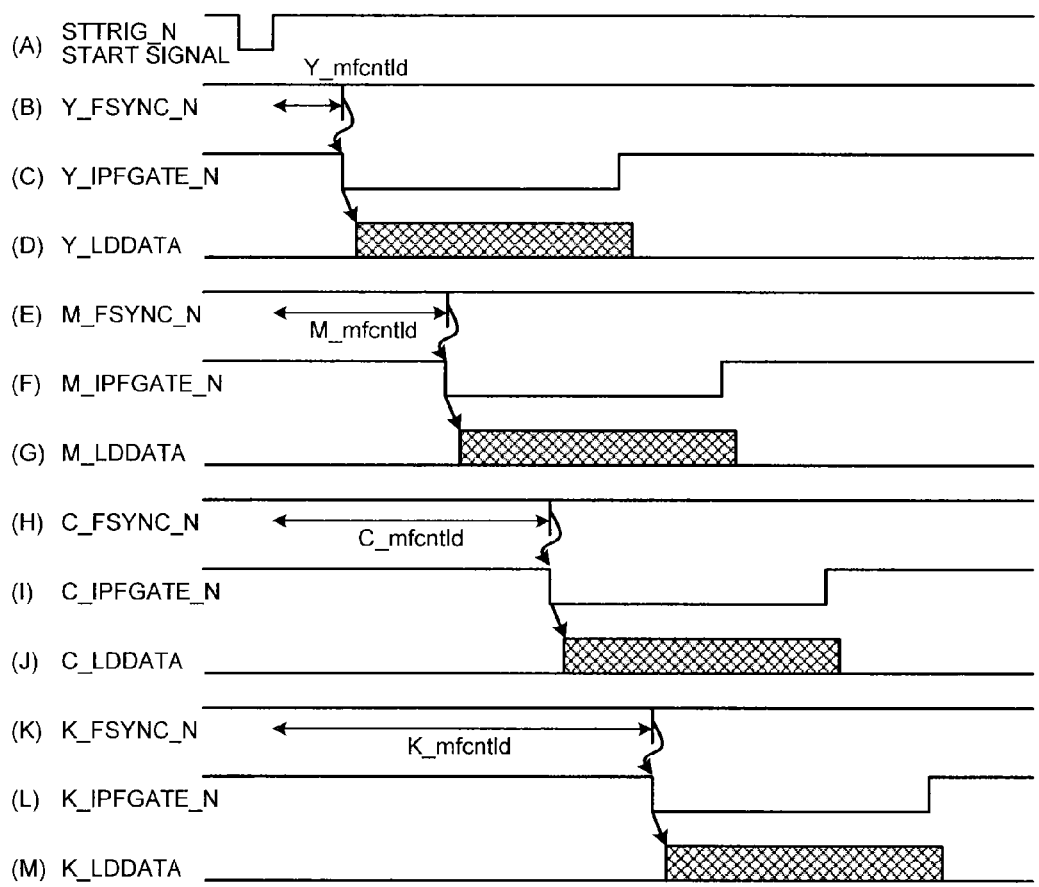
FIG. 8 is a diagram illustrating a timing chart of a signal output from an image processing unit 124 and the writing control unit 125, for controlling a timing for a writing operation for a sub scanning direction.

FIG. 8 is a diagram illustrating a timing chart of signals output from the image processing unit 124 and the writing control unit 125, to control writing timings for the sub scanning direction. In FIG. 8, (A) represents a start signal STTRIG_N, (B) represents a sub scanning timing signal Y_FSYNC_N for Y color, (C) represents a sub scanning gate signal Y_IPFGATE_N for Y color, (D) represents LD light emission data Y_LDDATA for Y color, (E) represents a sub scanning timing signal M_FSYNC_N for M color, (F) represents a sub scanning gate signal Y_IPFGATE_N for M color, (G) represents LD light emission data M_LDDATA for M color, (H) represents a sub scanning timing signal C_FSYNC_N for C color, (I) represents a sub scanning gate signal C_IPFGATE_N for C color, (J) represents LD light emission data C_LDDATA for C color, (K) represents a sub scanning timing signal K_FSYNC_N for K color, (L) represents a sub scanning gate signal K_IPFGATE_N for K color, and (M) represents LD light emission data K_LDDATA for K color.

As illustrated in FIG. 8, the writing control unit 125 counts the number of lines based on the start signal STTRIG_N output from the writing management unit 1222, and transmits the sub scanning timing signals (Y, M, C, K)_FSYNC_N of respective colors to the image processing unit 124.

After that, the image processing unit 124 transmits the sub scanning gate signals (Y, M, C, K)_IPFGATE_N of respective colors to the writing control unit 125, in response to the reception of the sub scanning timing signals (Y, M, C, K)_FSYNC_N of respective colors which serves as a trigger, and, in addition, transmits the image data (Y, M, C, K)_IPDATA[7:0]_N of respective colors.

The writing control units 126Y, 126M, 126C, and 126K of respective colors respectively transmit the LD light emission data (Y, M, C, K)_LDDATA of respective colors to the LD control units 101K, 101C, 101M, and 101Y, respectively.

In the case where the color shift in the sub scanning direction is corrected, the writing control unit 125 changes sub scanning delay amounts (Y, M, C, K)_mfcntld with respect to the start signal, according to the detected color shift amounts. In this embodiment, the writing control unit 125 reflects the color shift amounts with respect to K color serving as a reference on the sub scanning delay amounts (Y, M, C)_mfcntld of C, M, and Y colors, and changes the timings of the sub scanning timing signals (Y, M, C)_FSYNC_N of respective colors, thereby correcting the color shifts in the sub scanning direction.

Figure 9:
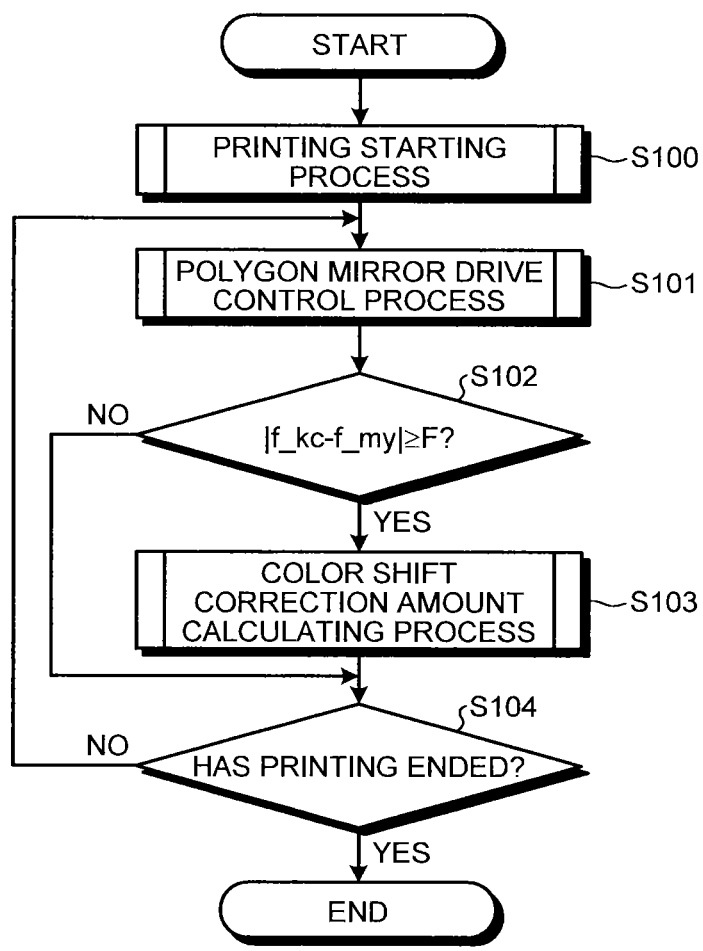
FIG. 9 is a flowchart illustrating a printing process in the color copier 100.

FIG. 9 is a flowchart illustrating a printing process in the color copier 100. The engine control unit 113 of the color copier 100 performs a printing starting process (Step S100). Next, the engine control unit 113 performs a polygon mirror drive control process (step S101).

Subsequently, the color shift correction unit 1221 causes the thermistor (KC) 102KC and the thermistor (MY) 102MY to detect temperatures of the writing unit (KC) 104KC and the writing unit (MY) 104MY, respectively. The color shift correction unit 1221 calculates a difference between a current temperature (f_kc) of the writing unit (KC) 104KC and a current temperature (f_my) of the writing unit (MY) 104MY, and compares the value of the calculated temperature difference with a predetermined threshold (F) (step S102). When the differential value (|f_kc−f_my|) is equal to or greater than the threshold (F) (Yes at Step S102), the color shift correction unit 1221 performs a color shift correction amount calculating process (step S103).

When the differential value (|f_kc−f_my|) is less than the threshold (F) (No at step S102), the control proceeds to step S104. When printing of the entire print job has ended at Step S104 (Yes at step S104), the printing process in the color copier 100 is completed. When printing of print job is determined to have not ended at step S104 (No at step S104), the control returns to step S101, and repeats the processes of step S101 to step S103.

In this way, in the embodiment, the color shift correction unit 1221 determines whether to perform the color shift correction amount calculating process, based on the temperature difference between the current temperature of the writing unit (KC) 104KC and the current temperature of the writing unit (MY) 104MY, and calculates the color shift correction amount whenever the temperature difference becomes equal to or greater than the threshold.

Figure 10:
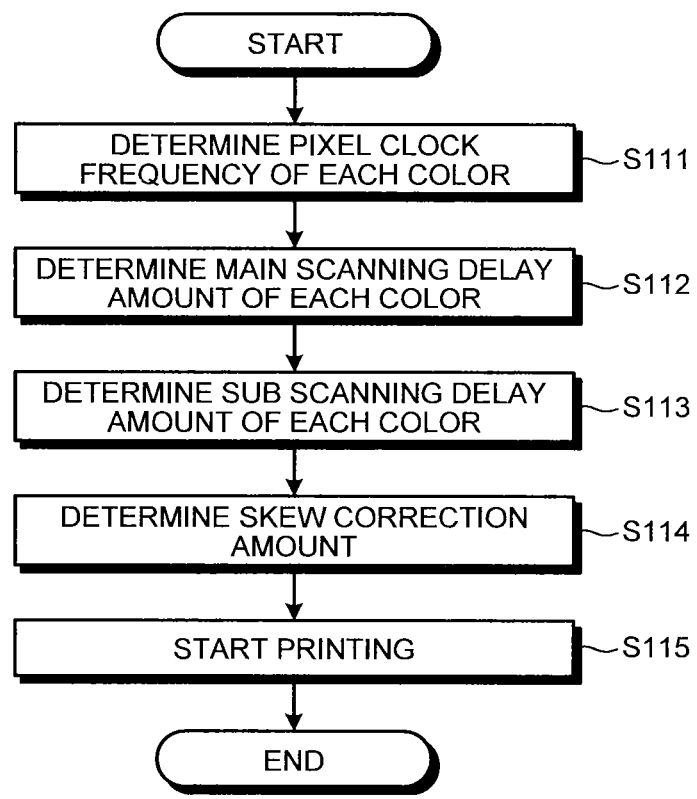
FIG. 10 is a flowchart illustrating a printing starting process (step S100) described in FIG. 9.

FIG. 10 is a flowchart illustrating the printing starting process (step S100) described in FIG. 9. The printing starting process is integrally executed by the engine control unit 113. When the printing process is started, first of all, the writing control unit 125 determines pixel clock frequencies of all K, C, M, and Y colors based on the main scanning magnification correction amount stored in the RAM 123 (step S111).

Next, the writing control unit 125 determines a main scanning delay amount of each color based on the main registration correction amount stored in the RAM 123 (step S112), and further determines a sub scanning delay amount of each color based on the sub registration correction amount stored in the RAM 123 (step S113).

Subsequently, the writing control unit 125 determines skew correction amounts of M, C, and Y colors with respect to the reference color (K color) based on the skew correction amounts and gradation information of respective colors stored in the RAM 123 (step S114). Next, the writing control unit 125 causes the printing operation to be started, while executing the color shift correction based on the main scanning pixel clock frequency, the main scanning delay amount, the sub scanning delay amount, and the skew correction amount for each determined color K, C, M, and Y (step S115).

The color shift correction for the main scanning direction is performed in a way that the writing control unit 125 controls the main scanning magnification of each color and the writing timing for the main scanning direction. Moreover, the correction of the main scanning magnification is achieved in a way that the writing control unit 125 changes the image frequency based on the detected magnification error amount of each color. To be noted is that the writing control unit 125 is equipped with a device that can finely set the frequency, for example, a clock generator which uses a VCO. Moreover, the writing timing for the main scanning direction is adjusted according to a position of a main scanning counter, which is operated using a synchronous detection signal for each color as a trigger, when an LD outputs data. In addition, the color shift correction for the sub scanning direction is performed in a way that the writing control unit 125 controls the writing timing for the sub scanning direction.

Figure 11:
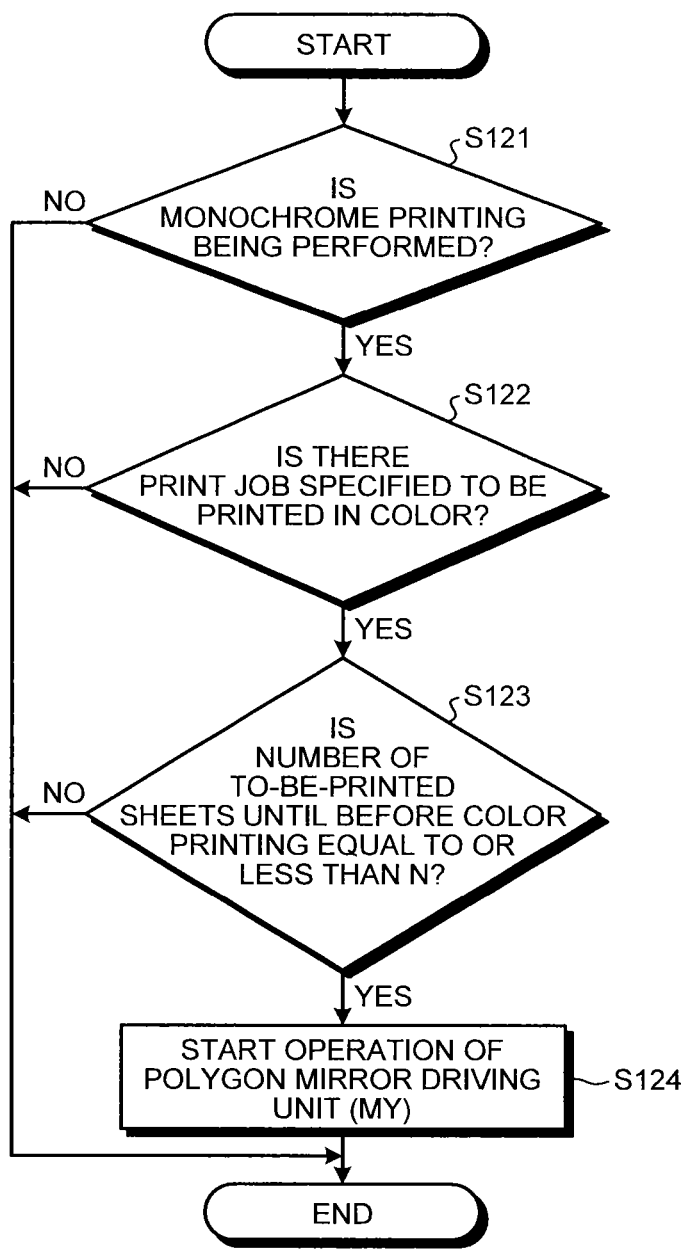
FIG. 11 is a flowchart illustrating a polygon mirror drive control process (step S101) described in FIG. 9.

FIG. 11 is a flowchart illustrating the polygon mirror drive control process (step S101) described in FIG. 9. The polygon mirror drive control process is integrally executed by the engine control unit 113.

The color copier 100, during the monochrome printing, drives only the polygon mirror driving unit (KC) 103KC to allow rotation of only the polygon mirror (KC). However, in the color copier 100 according to the embodiment, in a case where the color printing is performed after the monochrome printing has been performed, the polygon mirror driving unit (MY) 103MY is driven to operate during the execution of the monochrome printing so that the temperature difference between units may be eliminated and thus the color shift will not be influenced by the temperature difference between units.

When the printing process starts at step S100, the polygon mirror drive management unit 1223 monitors whether a print type, either monochrome print or color print, is specified for image data which is a target of the printing process. When the monochrome printing is currently being performed (Yes at step S121), the polygon mirror drive management unit 1223 detects a print job which has been specified to be printed in color among the remaining print jobs to be performed after the print job of the current image data is completed. When there is a detected print job which has been specified to be printed in color (Yes at step S122), the polygon mirror drive management unit 1223 determines the number of sheets to be printed during a period from the current printing process until before the next print job specified to be printed in color. When the number of sheets to be printed is equal to or less than a predetermined threshold (N) (Yes at step S123), the polygon mirror drive management unit 1223 causes the polygon mirror driving unit (MY) 103MY, currently stopped, to operate (step S124) and proceeds to step S102 of FIG. 9. That is, the polygon mirror drive management unit 1223 functions as a recording sheet number determining unit.

When the color printing is currently being performed at step S121 (No at step S121) or when there is no detected print job specified to be printed in color at step S122 (No at step S122), if the number of sheets to be printed is greater than the threshold (N) until the print job is performed at step S123 (No at step S123), the polygon mirror drive control process ends, and the control proceeds to step S102 in FIG. 9.

During the monochrome printing, if only the polygon mirror driving unit (MY) 103MY operates and the polygon mirror driving unit (MY) 103MY does not operate, the temperature difference between the writing unit (KC) 104KC and the writing unit (MY) 104MY is increased. Therefore, in the color copier 100 of the embodiment, in the polygon mirror drive control process, the writing unit (MY) 104MY is caused to be operated in advance a predetermined time before the timing at which the color printing is to be performed. This decreases the temperature difference between the writing unit (KC) 104KC and the writing unit (MY) 104MY, preventing the color shift attributable to the temperature difference between the writing unit (KC) 104KC and the writing unit (MY) 104MY.

That is, as described above with reference to FIG. 9, in the color copier 100 according to the embodiment, when the temperature difference between the writing unit (KC) 104KC and the writing unit (MY) 104MY becomes equal to or greater than threshold (F), the color shift correction amount calculating process is performed. However, in a case where the polygon mirror drive control process is used, the polygon mirror driving unit (MY) 103MY is operated before the temperature difference between the writing unit (KC) 104KC and the writing unit (MY) 104MY is increased. This reduces the number of executions of the color shift correction amount calculating process. As a result, it is possible to reduce the downtime, during which the printing process cannot be performed because the color shift correction amount calculating process is being performed in the color copier 100.

The threshold (N) may be a fixed value set beforehand, or may be a variable value that is changeable by the user. Specifically, the polygon mirror drive management unit 1223 uses the threshold (N) which is input by the user through an operation display unit to be described later. That is, the operation display unit functions as a sheet number threshold receiving unit.

Moreover, in another example, the polygon mirror drive management unit 1223 may determine the threshold based on a relationship between the current print job, which is being performed, and a previous or subsequent print job, and use the determined threshold. Specifically, for example, the polygon mirror drive management unit 1223 may determine a relatively large value as the threshold when the data amount in the previous or subsequent print job is small, but determine a relatively small value as the threshold when the data mount in the previous or subsequent print job is large. That is, the polygon mirror drive management unit 1223 functions as the sheet number threshold determining unit.

Moreover, according to the embodiment, the polygon mirror drive control process has been assumed to be integrally executed, but not limitedly, in the engine control unit 113. However, according to another example, the polygon mirror drive control process may be integrally executed by a controller such as a printer controller.

Figure 12:
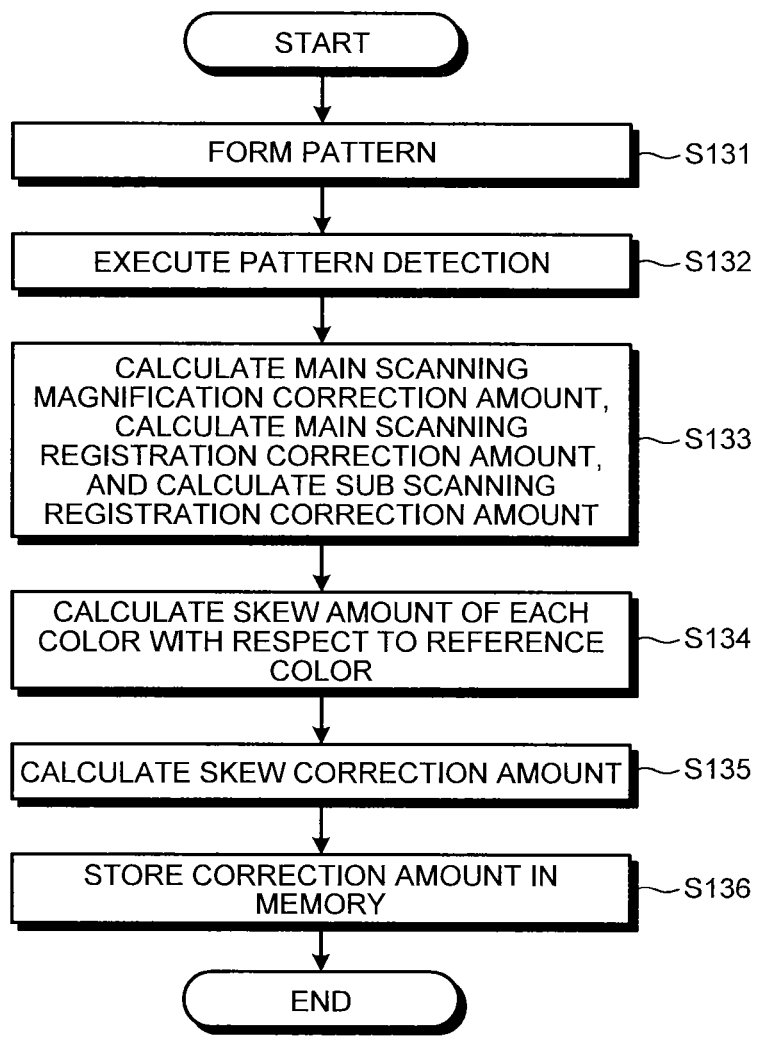
FIG. 12 is a flowchart illustrating a color shift correction amount calculating process (step S103) described in FIG. 9.

FIG. 12 is a flowchart illustrating the color shift correction amount calculating process (step S103) described in FIG. 9.

The color shift correction amount calculating process is integrally executed by the engine control unit 113. In the color shift correction amount calculating process, first, the color shift correction unit 1221 instructs the correction pattern generation units 132K, 132C, 132M, and 132Y of respective colors to generate the color shift correction patterns 14, and then the correction pattern generation units 132K, 132C, 132M, and 132Y of respective colors form the color shift correction patterns 14 on the transfer belt 3 according to the instruction (step S131). Here, the color shift correction unit 1221 functions as a correction image formation instructing unit.

Next, the pattern detection sensors 15 and 16 detect the color shift correction patterns 14 formed on the transfer belt 3 (step S132). Subsequently, when the pattern detection unit 121 converts the detection signals that are a result of the detection of the color shift correction patterns 14 by the pattern detection sensors 15 and 16 into digital data, the color shift correction unit 1221 calculates the main scanning magnification correction amount and the main/sub registration correction amounts with respect to the reference color (K color) from the digital data of the color shift correction patterns 14 (step S133). In addition, the color shift correction unit 1221 calculates the skew amount of each color with respect to the reference color (K color) (step S134). Next, the color shift correction unit 1221 calculates the skew correction amount used to perform the skew correction, based on the calculated skew amount (step S135).

Subsequently, the color shift correction unit 1221 stores the correction amounts including the calculated main scanning magnification correction amount, the main/sub registration correction amounts, and the skew correction amount in a memory such as the RAM 123 (or, in a nonvolatile memory) (step S136). Here, the color shift correction amount calculating process is completed. The correction amounts stored in the RAM 123 are used as correction amounts during the printing process until the following color shift correction amount calculating process is performed.

The color copier 100 is configured to perform the color shift correction amount calculating process at a time point before the printing starting process described in FIG. 9 is performed, and to store the correction amounts calculated by the color shift correction amount calculating process in the RAM 123 beforehand. As another example, the correction amounts calculated for the previous printing process through the color shift correction amount calculating process in the color copier 100 may be stored in the RAM 123 before the printing starting process is executed, and the values stored in the RAM 123 may be used when the printing starting process is executed.

Figure 13:
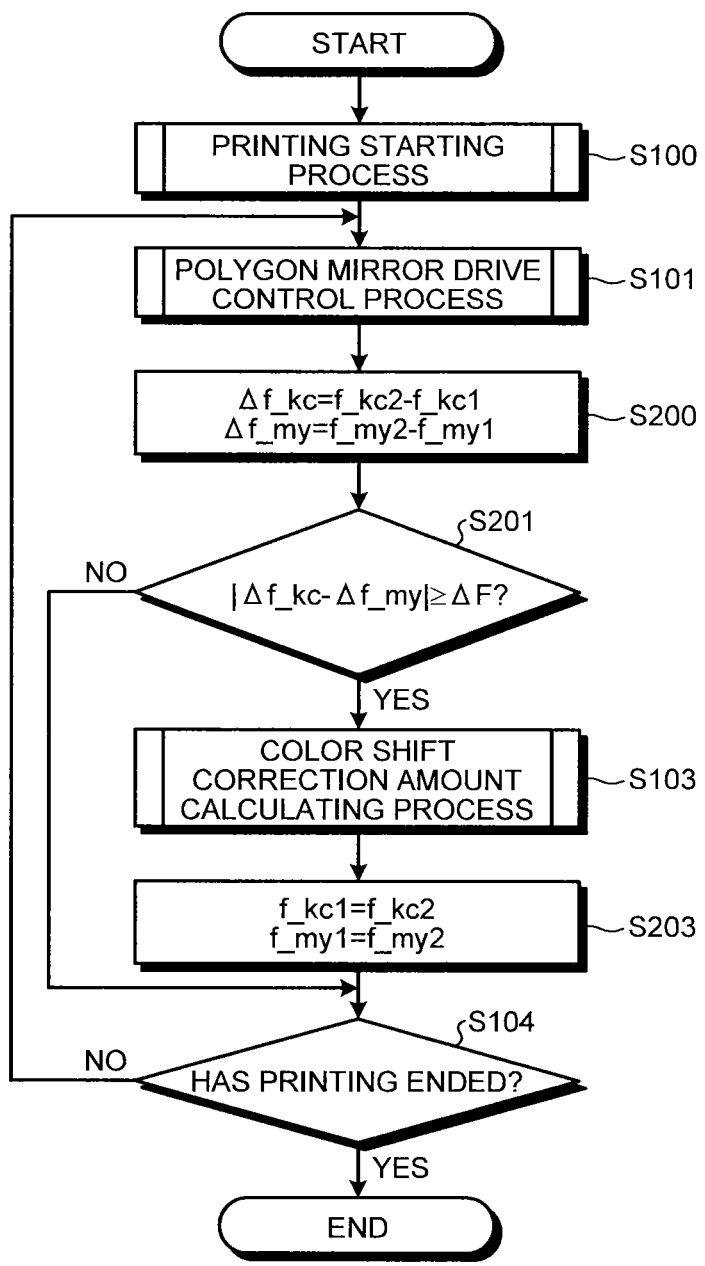
FIG. 13 is a flowchart illustrating another example of a printing process of the color copier 100.

FIG. 13 is a flowchart illustrating a first modification of the printing process of the color copier 100. In the example illustrated in FIG. 13, it is determined whether to perform a color shift correction amount calculating process based on a detection result of a current temperature and a previous temperature of each of the writing unit (KC) 104KC and the writing unit (MY) 104MY, instead of the difference in the current temperature between the writing unit (KC) 104KC and the writing unit (MY) 104MY.

In the example, the thermistor (KC) 102KC and the thermistor (MY) 102MY store the detection results in the RAM 123 every time the temperatures of the writing unit (KC) 104KC and the writing unit (MY) 104MY are detected. That is, the RAM 123 stores therein the history of the detection results of the temperatures of the writing unit (KC) 104KC and the writing unit (MY) 104MY.

Subsequently, after the polygon mirror drive control process has been performed (step S101), the color shift correction unit 1221 detects the current temperature (f_kc2) of the writing unit (KC) 104KC and the current temperature (f_my2) of the writing unit (MY) 104MY through the thermistor (KC) 102KC and the thermistor (MY) 102MY, respectively. In addition, referring to the RAM 123, the color shift correction unit 1221 determines the temperature (f_kc1) of the writing unit (KC) 104KC at the time of executing the previous color shift correction amount calculating process and the temperature (f_my1) of the writing unit (MY) 104MY at the time of executing the previous color shift correction amount calculating process. Subsequently, the color shift correction unit 1221 calculates a temperatures difference ($\Delta f\_kc$) between the current temperature and the previous temperature of the writing unit (KC) 104KC by using Expression (1) and a temperature difference ($\Delta f\_my$) between the current temperature and the previous temperature of the writing unit (MY) 104MY by using Expression (2) (step S200).

$$\Delta f\_kc = f\_kc2 - f\_kc1 \qquad (1)$$

$$\Delta f\_my = f\_my2 - f\_my1 \qquad (2)$$

Next, the color shift correction unit 1221 compares a differential value ($|f\_kc - \Delta f\_my|$) between the temperature difference ($\Delta f\_kc$) in the writing unit (KC) 104KC and the temperature difference ($\Delta f\_my$) in the writing unit (MY) 104MY, with a predetermined threshold ($\Delta F$) (step S201).

Subsequently, when the differential value ($|\Delta f\_kc - \Delta f\_my|$) is equal to or greater than the threshold ($\Delta F$) (Yes at step S201), the color shift correction unit 1221 performs the color shift correction amount calculating process (step S103). When the differential value ($|\Delta f\_kc - \Delta f\_my|$) is less than the threshold ($\Delta F$) (No at step S201), the control proceeds to step S104.

When the color shift correction amount calculating process (step S103) is completed, the color shift correction unit 1221 stores the current temperature (f_kc2) of the writing unit (KC) 104KC and the current temperature (f_my2) of the writing unit (MY) 104MY which have been detected at step S200 in the RAM 123 as a temperature (f_kc1) and a (f_my1), respectively (step S203). The other part of the printing process in the first modification is the same as the printing process described referring to FIGS. 9 to 12.

In this way, in this modification, the color copier 100 determines the timing when to perform the color shift correction amount calculating process as a whole not only based on the current temperatures of the writing unit (KC) 104KC and the writing unit (MY) 104MY but also based on the past temperatures of the writing unit (KC) 104KC and the writing unit (MY) 104MY.

Figure 14:
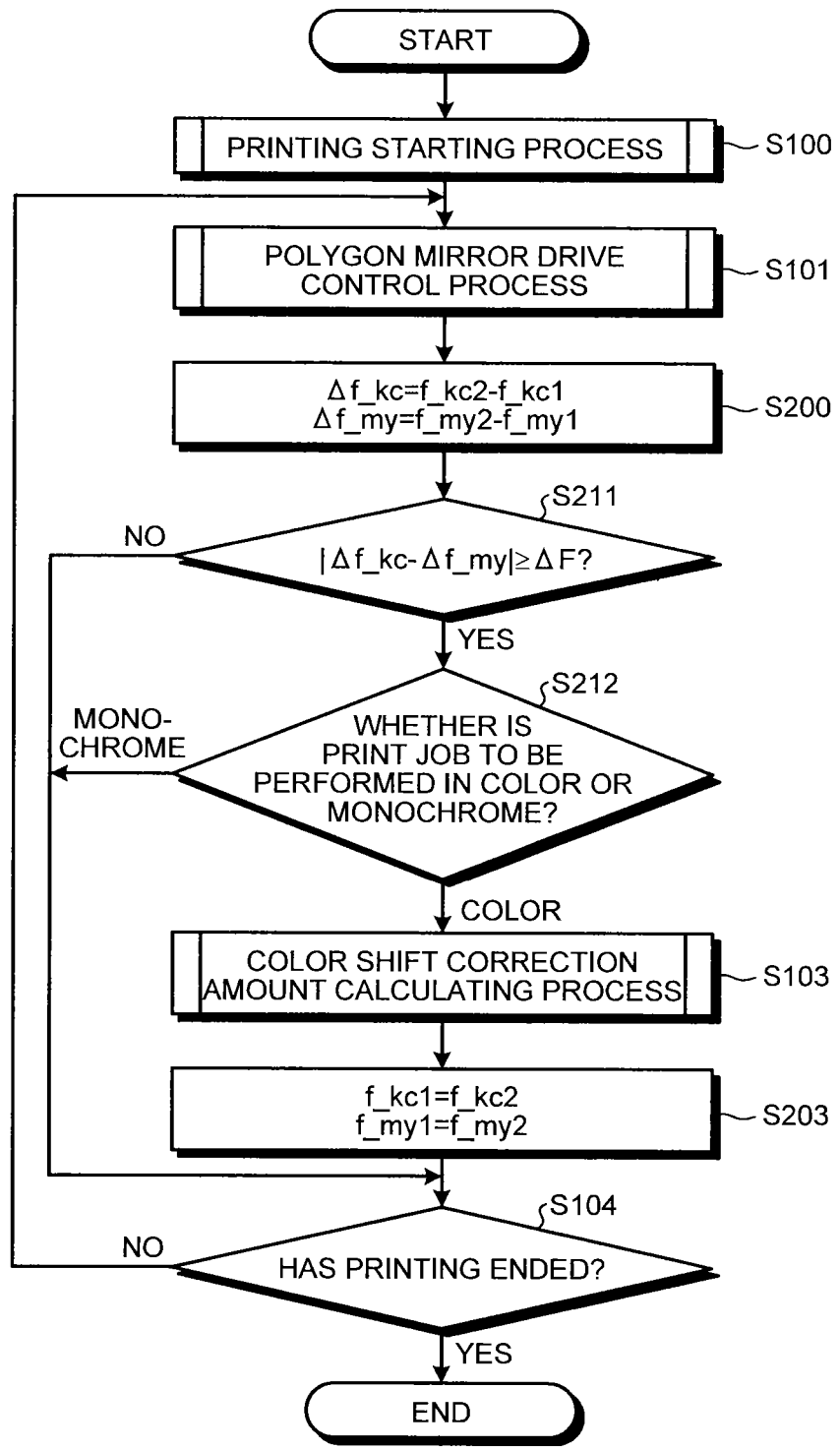
FIG. 14 is a flowchart illustrating a further example of a printing process of the color copier 100.

FIG. 14 is a flowchart illustrating a second modification of the printing process of the color copier 100. In the modification of FIG. 14, like the first modification described referring to FIG. 13, the color shift correction amount calculating process is determined to be performed based on the current and past temperatures of the writing unit (KC) 104KC and the current and past temperatures of the writing unit (MY) 104MY. In addition, in this modification, the color shift correction amount calculating process is performed only at the time of executing the color printing.

That is, the color shift correction unit 1221 compares the differential value ($|\Delta f\_kc - \Delta f\_my|$) with the predetermined threshold ($\Delta F$), and determines whether the current printing process is the color printing or the monochrome printing when the differential value ($|\Delta f\_kc - \Delta f\_my|$) is equal to or greater than the threshold ($\Delta F$) (Yes at step S211). Subsequently, the color shift correction unit 1221 performs the color shift correction amount calculating process (step S103) only when the color printing is determined to be being performed (Color at step S212), and proceeds to step S104 when the monochrome printing is determined to be being performed (Monochrome at step S212). The other part of the printing process according to the second modification is the same as the printing process of the first modification.

Although the color copier 100 according to the embodiment is equipped with a plurality of writing units, the configuration of the writing unit is not limited thereto. As another example, the color copier 100 may be equipped with a single writing unit and the writing unit may include a plurality of thermistors.

Moreover, the number of thermistors included in the color copier 100 is not limited to the embodiment disclosed herein. In a color copier according to a further example, each of the plurality of writing units may include a plurality of thermistors.

Moreover, in the embodiment, the thermistor is used as a temperature detecting mechanism. However, the temperature detecting mechanism may not be limited to the thermistor but be other means as long as they can detect a value corresponding to the temperature of the writing unit. The temperature detecting mechanism may be a certain means other than the thermistor. In yet another example, the temperature detecting mechanism may be a mechanism that detects a certain quantity from which a temperature can be estimated. For example, the quantity may be the number of continuously printed sheets in a color copier.

Figure 15:
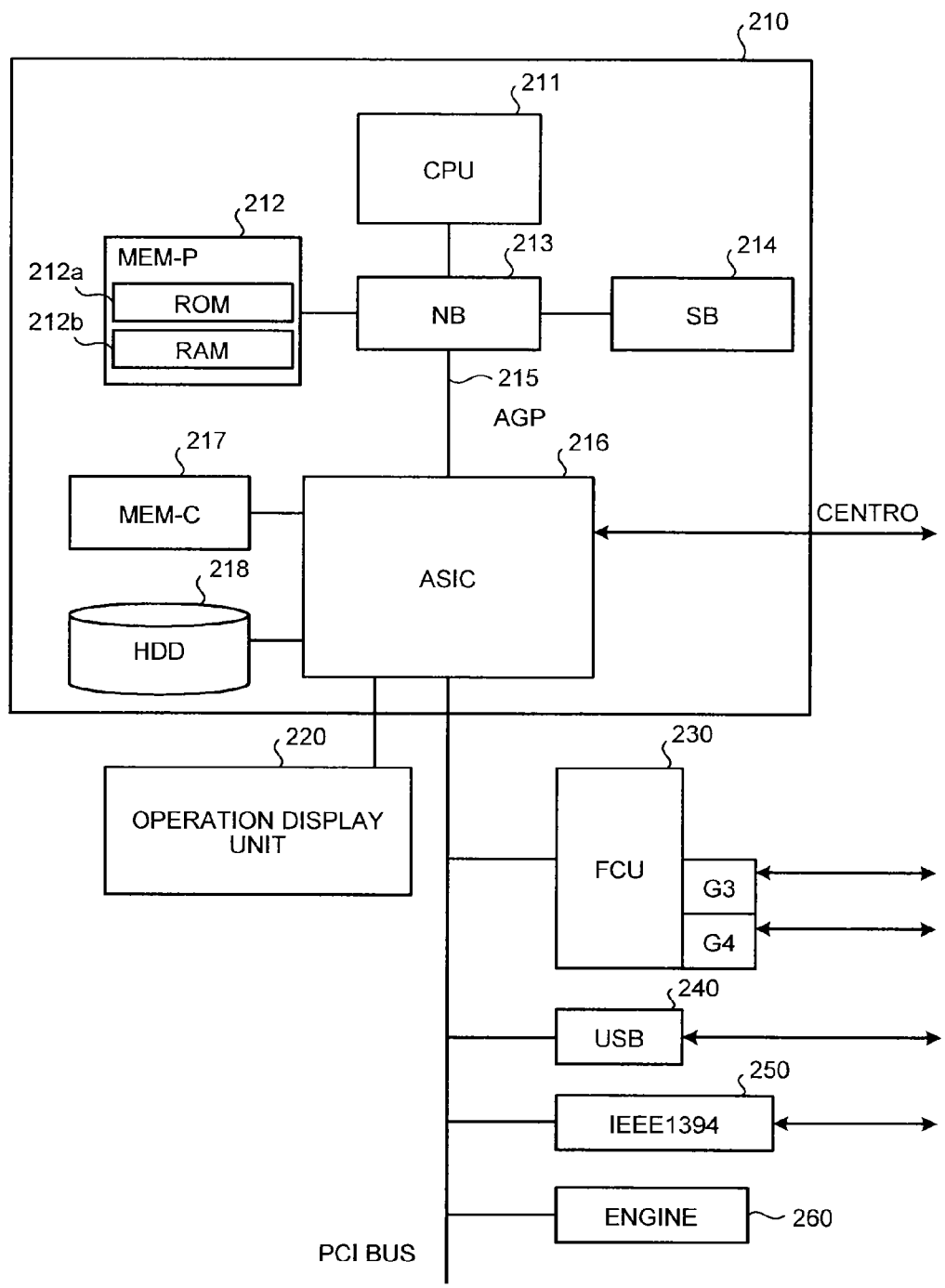
FIG. 15 is a diagram illustrating a hardware configuration of the color copier 100.

FIG. 15 is a block diagram illustrating a hardware configuration example of the color copier 100. As illustrated in the drawing, the color copier 100 has a configuration in which a controller 210 and an engine 260 are connected by a PCI (Peripheral Component Interface) bus. The controller 210 is a controller which controls overall operation of the color copier 100, drawing, communication, and input which is entered through an operation unit (not illustrated). The engine 260 is a printer engine that is connectable to a PCI bus. For example, the engine 260 may be a monochrome plotter, a one-drum color plotter, a four-drum color plotter, a scanner, a fax unit, or the like. The engine 260 may further include, for example, an image processing portion for performing image processing such as error diffusion and gamma conversion in addition to an engine portion such as a plotter.

The controller 210 includes a CPU 211, a North Bridge (NB) 213, a system memory (MEM-2) 212, a South Bridge (SB) 214, a local memory (MEM-C) 217, an ASIC (Application Specific Integrated Circuit) 216, and a Hard Disk Drive (HDD) 218. The controller 210 has a configuration in which the North Bridge (NB) 213 and the ASIC 216 are connected by an AGP (Accelerated Graphics Port) bus 215. Moreover, the MEM-P 212 further includes a ROM (Read Only Memory) 212*a* and a RAM (Random Access Memory) 212*b*.

The CPU 211 performs the overall control of a Multi-Function Peripheral, includes a chip set composed of the NB 213, the MEM-P 212, and the SB 214, and is connected to other devices via the chip set.

The NB 213 is a bridge to connect the CPU 211 to the MEM-P 212, to the SB 214, and to the AGP bus 215. The NB 213 includes a memory controller which controls an access to the MEM-P 212, a PCI master, and an AGP target.

The MEM-P 212 is a system memory used as a storage memory for storing programs and data, a loading memory for loading programs and data, a drawing memory of a printer, or the like. The MEM-P 212 is composed of the ROM 212*a* and the RAM 212*b*. The ROM 212*a* is a read only memory used as a storage memory for storing programs and data, and the RAM 212*b* is a readable and writable memory used as a loading memory for loading programs and data, a drawing memory of a printer, or the like.

The SB 214 is a bridge to connect the NB 213 to the PCI device, and to peripheral devices. The SB 214 is connected with the NB 213 via the PCI bus, and the PCI bus is also connected to a network interface (I/F) unit and the like.

The ASIC 216 is an IC (Integrated Circuit) for image processing which has a hardware configuration for image processing. The ASIC 216 functions as a bridge to connect the AGP bus 215, the PCI bus, the HDD 218, and the MEM-C 217 to each other. The ASIC 216 includes a PCI target and a AGP master, an arbiter (ARB) which is the core of the ASIC 216, a memory controller which controls the MEM-C 217, a plurality of DMACs (Direct Memory Access Controllers) that rotates image data by a hardware logic or the like, and a PCI unit that performs data transfer to the engine 260 via the PCI bus. The ASIC 216 is connected, via the PCI bus, to a FCU (Facsimile Control Unit) 230, a USB (Universal Serial Bus) 240, and an IEEE 1394 (the Institute of Electrical and Electronics Engineers 1394) interface 250. An operation display unit 220 is directly connected to the ASIC 216.

The MEM-C 217 is a local memory used as a copying image buffer or a code buffer. The HDD (Hard Disk Drive) 218 is a storage for accumulation of image data, accumulation of programs, accumulation of font data, and accumulation of templates.

The AGP bus 215 is a bus interface for a graphics accelerator card proposed to speed up a graphics process. The AGP bus 215 boosts the speed of the graphics accelerator card by directly accessing the MEM-P 212 with high throughput.

The programs executed in the color copier 100 of the embodiment are incorporated in the ROM, or the like for distribution to users. The programs executed in the color copier 100 of the embodiment may be provided as a file of an installable or executable format, and may be provided as recorded in a computer-readable recording medium such as a CD-ROM, a flexible disk (FD), a CD-R, and a DVD (Digital Versatile Disk).

In the above embodiment, the image forming apparatus of the invention has been described in connection with an example in which it is applied to a color copier. However, it also can be applied to a multifunction peripheral having at least two functions among a copier function, a printer function, a scanner function, and a facsimile function. It even can be applied to any apparatuses as long as they serve as an image forming apparatus, for example, a printer, a scanner device, or a facsimile.

According to the present invention, the generation of color shifts during a color printing operation can be reduced and moreover the downtime consumed by a color shift correction process can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image on a recording sheet based on image data, the image forming apparatus comprising:
   an image data receiving unit that receives the image data, and print-type specification information that specifies whether to print the image data in color or monochrome;

a first light source that, when the image data receiving unit receives a print-type specification information specifying that print target image data is to be printed in color, emits light based on the print target image data;

a first deflection unit that deflects the light from the first light source;

a first driving unit that drives the first deflection unit;

a second light source that, when the image data receiving unit receives a print-type specification information specifying that print target image data is to be printed in monochrome, emits light based on the print target image data;

a second deflection unit that deflects the light from the second light source;

a second driving unit that drives the second deflection unit;

an image forming unit that forms a monochrome image corresponding to the print target image data on a recording sheet based on the light deflected by the second deflection unit, and forms a color image corresponding to the print target image data on a recording sheet based on both of the light deflected by the first deflection unit and the light deflected by the second deflection unit;

a drive control unit that, when the image data receiving unit receives first image data and first print-type specification information specifying that the first image data is to be printed in monochrome and receives second image data to be subsequently processed after the first image data and second print-type specification information specifying that the second image data is to be printed in color, causes the first driving unit to operate while a monochrome image corresponding to the first image data is being formed by the image forming unit;

a temperature detection unit that detects a temperature of the first deflection unit and a temperature of the second deflection unit;

a correction image formation instruction unit that instructs the image forming unit to form positional shift correction images used to correct positions of images of respective colors formed on a recording sheet when a difference in temperature between the first deflection unit and the second deflection unit is equal to or greater than a predetermined temperature threshold; and a color shift correction unit that corrects the positions of the images of the respective colors, based on the positional shift correction images.

2. The image forming apparatus according to claim 1, further comprising:

a recording sheet number determining unit that, when the image forming unit starts to form a monochrome image corresponding to the first image data, determines a number of recording sheets on which the monochrome image is to be formed, from a present time until before the color image corresponding to the second image is formed, wherein the drive control unit, when the number of recording sheets determined by the recording sheet number determining unit is equal to or less than a predetermined sheet number threshold, causes the first driving unit to operate while the image forming unit is forming the monochrome image corresponding to the first image data.

3. The image forming apparatus according to claim 2, further comprising:

a sheet number threshold receiving unit that receives the sheet number threshold entered by a user, wherein the drive control unit compares the number of recording sheets with the sheet number threshold received by the sheet number threshold receiving unit.

4. The image forming apparatus described in claim 2, further comprising:

a sheet number threshold determining unit that determines the sheet number threshold based on the image data and the print-type specification information received by the image data receiving unit at a time point before the image data receiving unit receives the first image data, and based on the image data and the print-type specification information received by the image data receiving unit at a time point after the image data receiving unit received the second image data.

* * * * *